(12) United States Patent
Takeyasu (10) Patent No.: US 11,110,893 B2
(45) Date of Patent: Sep. 7, 2021

(54) IN-VEHICLE APPARATUS, AUTHENTICATION METHOD, AND COMPUTER READABLE MEDIUM

(71) Applicant: MITSUBISHI ELECTRIC CORPORATION, Tokyo (JP)

(72) Inventor: Masaaki Takeyasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/770,399

(22) PCT Filed: Dec. 22, 2017

(86) PCT No.: PCT/JP2017/046253
§ 371 (c)(1),
(2) Date: Jun. 5, 2020

(87) PCT Pub. No.: WO2019/123661
PCT Pub. Date: Jun. 27, 2019

(65) Prior Publication Data
US 2020/0384950 A1   Dec. 10, 2020

(51) Int. Cl.
*B60R 25/24* (2013.01)
*B60Q 1/32* (2006.01)
*B60R 25/10* (2013.01)
*B60R 25/20* (2013.01)

(52) U.S. Cl.
CPC .......... *B60R 25/241* (2013.01); *B60Q 1/323* (2013.01); *B60R 25/1003* (2013.01); *B60R 25/2045* (2013.01); *B60R 25/246* (2013.01); *B60R 2325/101* (2013.01); *B60R 2325/205* (2013.01)

(58) Field of Classification Search
None
See application file for complete search history.

(56) References Cited

U.S. PATENT DOCUMENTS

| 10,373,415 B2 * | 8/2019 | Atsumi .................. B60R 25/25 |
| 2005/0237152 A1 | 10/2005 | Nakashima et al. |
| 2010/0321946 A1 * | 12/2010 | Dingman ................ E05B 85/16 362/501 |
| 2012/0062361 A1 | 3/2012 | Kosugi |

(Continued)

FOREIGN PATENT DOCUMENTS

| JP | 10-25936 A | 1/1998 |
| JP | 2002-211311 A | 7/2002 |

(Continued)

OTHER PUBLICATIONS

International Search Report (PCT/ISA/210) issued in PCT/JP2017/046253 dated Mar. 27, 2018.

(Continued)

*Primary Examiner* — Carlos Garcia
(74) *Attorney, Agent, or Firm* — Birch, Stewart, Kolasch & Birch, LLP (57) ABSTRACT

An authentication pattern generation unit, if a signal from a portable device is received, prompts a user who uses the portable device to perform a specific action. A checking unit determines whether or not the user has performed the specific action. If the checking unit determines that the user has performed the specific action, the checking unit authenticates that the portable device is an authorized device.

9 Claims, 8 Drawing Sheets

(56) References Cited

U.S. PATENT DOCUMENTS

| | | | |
|---|---|---|---|
| 2012/0084862 A1* | 4/2012 | Freeman | G06F 9/44505 |
| | | | 726/23 |
| 2015/0145648 A1 | 5/2015 | Winkelman | |
| 2015/0291126 A1* | 10/2015 | Nicholls | E05F 15/73 |
| | | | 701/49 |
| 2015/0332530 A1 | 11/2015 | Kishita | |
| 2016/0225203 A1* | 8/2016 | Asmar | G07C 9/00309 |
| 2017/0136990 A1 | 5/2017 | Tercero | |
| 2017/0203685 A1 | 7/2017 | Hirai et al. | |
| 2018/0178758 A1 | 6/2018 | Yamaguchi | |
| 2018/0208204 A1* | 7/2018 | Chen | G06F 1/163 |
| 2019/0308639 A1* | 10/2019 | Ricci | H04W 4/70 |
| 2020/0122631 A1* | 4/2020 | Huizen | B60R 1/1207 |
| 2020/0216025 A1* | 7/2020 | Le Bourgeois | B60R 25/241 |

FOREIGN PATENT DOCUMENTS

| | | |
|---|---|---|
| JP | 2004-68434 A | 3/2004 |
| JP | 2005-307646 A | 11/2005 |
| JP | 2006-348513 A | 12/2006 |
| JP | 2008-15839 A | 1/2008 |
| JP | 2009-57014 A | 3/2009 |
| JP | 2009-179998 A | 8/2009 |
| JP | 2010-31456 A | 2/2010 |
| JP | 2011-904 A | 1/2011 |
| JP | 2012-57368 A | 3/2012 |
| JP | 2012-237102 A | 12/2012 |
| JP | 2014-114569 A | 6/2014 |
| JP | 2015-218457 A | 12/2015 |
| JP | 2016-22917 A | 2/2016 |
| JP | 2016-66156 A | 5/2016 |
| JP | 2016-155526 A | 9/2016 |
| JP | 2017-88016 A | 2/2017 |
| JP | 2017-87769 A | 5/2017 |
| JP | 2017-160703 A | 9/2017 |
| WO | WO 2016/027315 A1 | 2/2016 |
| WO | WO 2017/017877 A1 | 2/2017 |

OTHER PUBLICATIONS

Japanese Office Action for application No. 2010-560007 dated Feb. 18, 2020.

\* cited by examiner

| ID | USER IDENTIFICATION NUMBER | PRESENTING INFORMATION | | AUTHENTICATION PATTERN |
|---|---|---|---|---|
| | | PRESENTING DEVICE | PRESENTING PATTERN | |
| 1 | FOB-ID1 | LIGHTING DEVICE (LIGHTING AREA BESIDE VEHICLE) | REPEATING LIGHTING DISTANT AREA ⇒ LIGHTING CLOSE AREA | MOVING WITHIN LIGHTED AREA (STEPPING CLOSE TO VEHICLE ⇒ STEPPING AWAY FROM VEHICLE) |
| 2 | FOB-ID1 | LIGHTING DEVICE (LIGHTING AREA BESIDE VEHICLE) | REPEATING LIGHTING CLOSE AREA ⇒ LIGHTING DISTANT AREA | MOVING WITHIN LIGHTED AREA (STEPPING AWAY FROM VEHICLE ⇒ STEPPING CLOSE TO VEHICLE) |
| 3 | FOB-ID2 | LIGHTING DEVICE (INTERIOR LIGHT) | FLASHING TWICE | STEPPING CLOSE TO VEHICLE ⇒ STEPPING AWAY FROM VEHICLE, TWICE |
| 4 | FOB-ID2 | LIGHTING DEVICE (HEAD LIGHT) | FLASHING TWICE | PRESSING UNLOCK BUTTON 3 TIMES |
| 5 | FOB-ID2 | ALARMING DEVICE | ALARM TWICE | PRESSING UNLOCK BUTTON 4 TIMES |
| 6 | ⋮ | ⋮ | ⋮ | ⋮ |
| 7 | | | | |

IN-VEHICLE APPARATUS, AUTHENTICATION METHOD, AND COMPUTER READABLE MEDIUM

TECHNICAL FIELD

The present invention relates to an in-vehicle apparatus, an authentication method, and an authentication program.

BACKGROUND ART

An in-vehicle control system, such as a keyless entry system and a smart entry system, has been acknowledged (for example, Patent Literature 1). Based on a radio signal transmitted and received between an in-vehicle control apparatus that is mounted on a vehicle and a portable device (for example, an electronic key) that a user of such vehicle carries, the in-vehicle control system permits operation to the vehicle, such as locking or unlocking of a door and turning on or off of a light in/on the vehicle.

According to the keyless entry system, a lock signal or an unlock signal is transmitted from a portable device to an in-vehicle control apparatus when a user operates the portable device. Upon receiving the lock signal or the unlock signal from the portable device, the in-vehicle control apparatus locks or unlocks the door of the vehicle.

And, according to the smart entry system, a vehicle control, such as locking or unlocking a door of a vehicle is carried out only by a user carrying a portable device coming close to the vehicle or touching a doorknob.

Recently, to the in-vehicle control system, a method to steal a vehicle called a relay attack has been carried out. In the relay attack, a relay device relays a request signal transmitted from an in-vehicle control apparatus, and thus letting a portable device in a distant place receive such request signal. Then, the portable device in the distant place carries out unauthorized communications with the in-vehicle control apparatus, pretending to be an authorized portable device. In this way, an operation such as unlocking a door of a vehicle can be carried out unauthorizedly.

Against the relay attack, a countermeasure of installing in a portable device, a motion sensor to sensor motion of the portable device has been taken. For example, in Patent Literature 1, a motion sensor installed in a portable device senses the portable device moving if a door unlocking request is made while a vehicle is in a locked state. And, only if it is sensed that the portable device is moving, control to an in-vehicle control apparatus is permitted. In this way, if a malicious third party attempts the relay attack while a user keeps the portable device (keeps it motionless) at a place away from the vehicle, the motion sensor does not sense motion of such portable device. Thus, no permission to control the in-vehicle control apparatus is granted, preventing the door from being unlocked.

CITATION LIST

Patent Literature

Patent Literature 1: JP 2017-88016 A

SUMMARY OF INVENTION

Technical Problem

Patent Literature 1, however, has a problem that control to an in-vehicle control apparatus is still implemented and a damage is caused by a relay attack if, for example, a user is off a vehicle and is moving to another place, and thereby a motion sensor senses motion of a portable device.

A main objective of the present invention is to solve this problem. In specific, the main objective of the present invention is to realize a configuration to prevent unauthorized operation to a vehicle.

Solution to Problem

An in-vehicle apparatus according to the present invention includes:

an action prompting unit, if a signal from a radio communication device is received, to prompt a user who uses the radio communication device to perform a specific action;

a determination unit to determine whether or not the user has performed the specific action; and an authentication unit, if it is determined by the determination unit that the user has performed the specific action, to authenticate that the radio communication device is an authorized device.

Advantageous Effects of Invention

According to the present invention, a radio communication device is authenticated as an authorized device only if it is determined that a user has performed a specific action. Therefore, it is possible to prevent unauthorized operation to a vehicle using an unauthorized device pretending to be such radio communication device.

DESCRIPTION OF EMBODIMENTS

Embodiment 1

In the present description and drawings, a part denoted by a same reference sign indicates a same or corresponding part.

*Description of Configuration*

Figure 1:
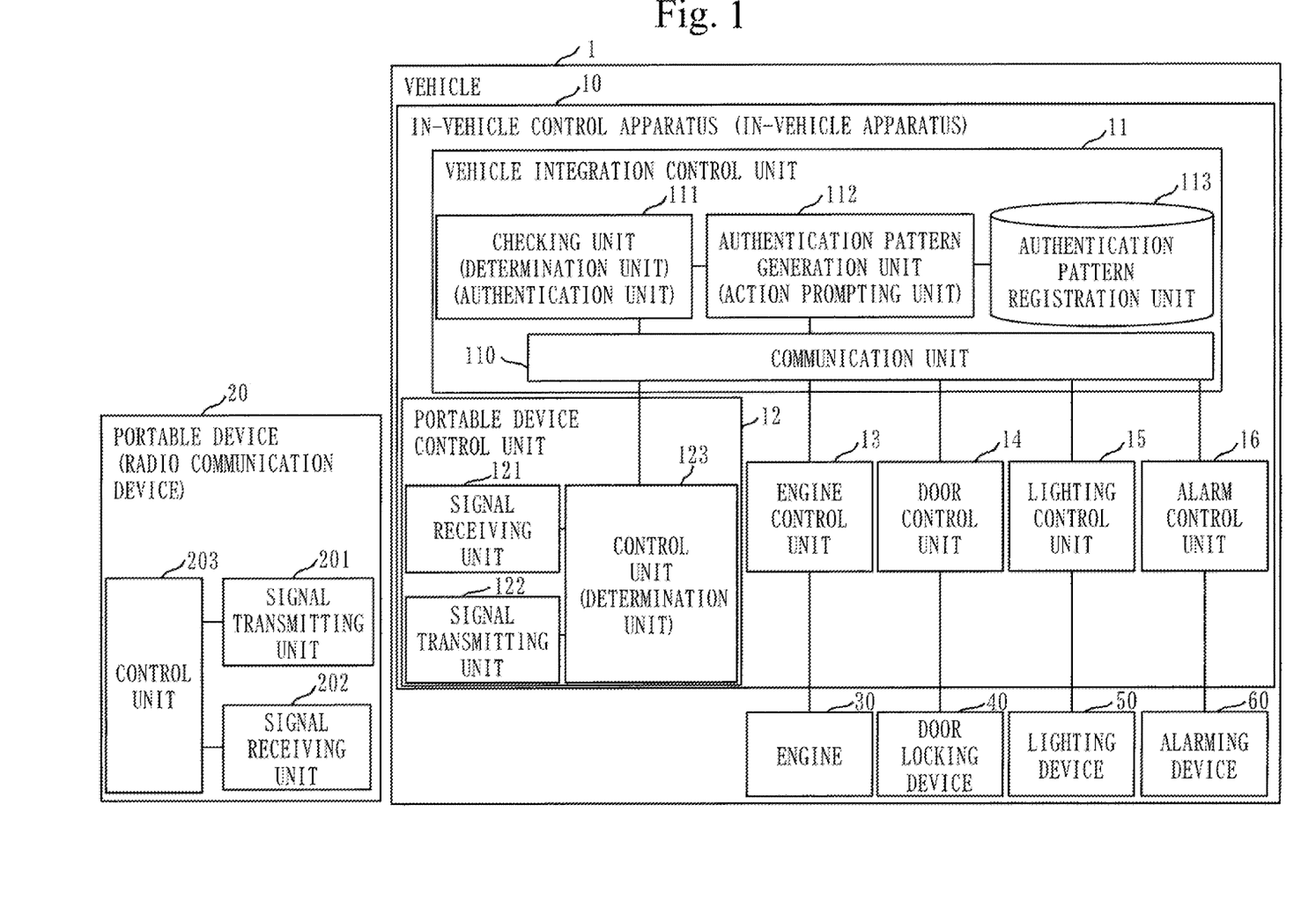
FIG. 1 is a diagram illustrating an example of a configuration of an in-vehicle control system according to Embodiment 1.

FIG. 1 illustrates an example of a configuration of an in-vehicle control system according to the present embodiment.

The in-vehicle control system includes an in-vehicle control apparatus 10 that is mounted on a vehicle 1 and a portable device 20 that a user of the vehicle 1 carries.

The in-vehicle control apparatus 10 is equivalent to an in-vehicle apparatus. And, the portable device 20 is equivalent to a radio communication device. And, operation carried out in the in-vehicle control apparatus 10 is equivalent to an authentication method and an authentication program.

In the in-vehicle control system according to the present embodiment, the in-vehicle control apparatus 10 and the portable device 20 carries out radio communications. And, the in-vehicle control apparatus 10 permits operation to the vehicle 1 in accordance with instructions given by the portable device 20.

The operation to the vehicle 1 according to the present embodiment includes, for example, engine control operation, door control operation, and lighting control operation.

The engine control operation controls starting and shutting down of an engine of the vehicle 1.

The door control operation controls locking and unlocking of a door of the vehicle 1.

The lighting control operation controls lighting of a headlight, an interior light, a road lighting device, and the like of the vehicle 1.

On the vehicle 1, the in-vehicle control apparatus 10, an engine 30, a door locking device 40, a lighting device 50, and an alarming device 60 are mounted.

The in-vehicle control apparatus 10 includes a vehicle integration control unit 11, a portable device control unit 12, an engine control unit 13, a door control unit 14, a lighting control unit 15, and an alarm control unit 16.

The vehicle integration control unit 11 controls the portable device control unit 12, the engine control unit 13, the door control unit 14, the lighting control unit 15, and the alarm control unit 16.

The portable device control unit 12 controls the radio communications with the portable device 20.

The engine control unit 13 controls the engine 30.

The door control unit 14 controls the door locking device 40.

The lighting control unit 15 controls the lighting device 50.

The alarm control unit 16 controls the alarming device 60.

In the present embodiment, the vehicle integration control unit 11, the portable device control unit 12, the engine control unit 13, the door control unit 14, the lighting control unit 15, and the alarm control unit 16 are arranged all in the in-vehicle control apparatus 10. However, a part of these control units may be arranged in a device other than the in-vehicle control apparatus 10.

The vehicle integration control unit 11 includes a communication unit 110, a checking unit 111, an authentication pattern generation unit 112, and an authentication pattern registration unit 113.

The communication unit 110 communicates with a control unit 123 in the portable device control unit 12, the engine control unit 13, the door control unit 14, the lighting control unit 15, and the alarm control unit 16.

The authentication pattern registration unit 113 stores authentication pattern information. The authentication pattern information presents a plurality of authentication patterns, which are actions that a user of the portable device 20 is caused to perform. Each of the authentication patterns is an action that only a person near the vehicle 1 can perform.

When the authentication pattern generation unit 112 receives a signal from the portable device 20, the authentication pattern generation unit 112 selects an authentication pattern that the user is caused to perform from among the plurality of authentication patterns presented in the authentication pattern information. Then, the authentication pattern generation unit 112 prompts the user to perform the selected authentication pattern.

In other words, if the authentication pattern generation unit 112 receives a signal from the portable device 20, the authentication pattern generation unit 112 prompts the user to perform a specific action selected from among a plurality of actions.

The authentication pattern generation unit 112 is equivalent to an action prompting unit. And, a process performed by the authentication pattern generation unit 112 is equivalent to an action prompting process.

The checking unit 111 determines whether or not the user has performed the specific action (authentication pattern). As described later, the checking unit 111 analyzes movement of the user sensed by the control unit 123, and determines whether or not the user has performed the specific action.

Also, if the checking unit 111 determines that the user has performed the specific action, the checking unit 111 authenticates that the portable device 20 is an authorized device.

If the checking unit 111 has authenticated that the portable device 20 is the authorized device, the checking unit 111, in accordance with the signal transmitted by the portable device 20, controls any of the engine control unit 13, the door control unit 14, the lighting control unit 15, and the alarm control unit 16. For example, if a signal requesting unlocking of a door is received from the portable device 20 after authentication of the portable device 20, the checking unit 111 instructs the door control unit 14 to unlock the door.

The checking unit 111 is equivalent to a determination unit and an authentication unit. And a process performed by the checking unit 111 is equivalent to a determination process and an authentication process.

The portable device control unit 12 includes a signal receiving unit 121, a signal transmitting unit 122, and the control unit 123.

The signal receiving unit 121 and the signal transmitting unit 122 carries out the radio communications with the portable device 20.

A plurality of signal receiving units 121 and a plurality of signal transmitting units 122 may be installed in the vehicle 1.

The control unit 123 controls the signal receiving unit 121 and the signal transmitting unit 122. For example, the control unit 123 changes a radio communication range.

The control unit 123 also carries out a first authentication of the portable device 20.

If the user is prompted to perform an action of an authentication pattern by the authentication pattern generation unit 112, the control unit 123 also senses movement of the user. Then, the control unit 123 notifies the checking unit 111 of the sensed movement of the user. A sensing procedure of movement by the control unit 123 will be described later.

The control unit 123, together with the checking unit 111, is equivalent to a determination unit. A process carried out in the control unit 123 constitutes a part of a determination process.

The portable device 20 is a dedicated terminal device, such as an electronic key (key fob: FOB).

The portable device 20 includes a signal transmitting unit 201, a signal receiving unit 202, and a control unit 203.

The signal transmitting unit 201 and the signal receiving unit 202 carries out radio communication with the in-vehicle control apparatus 10.

The control unit 203 controls the signal transmitting unit 201 and the signal receiving unit 202.

Figure 2:
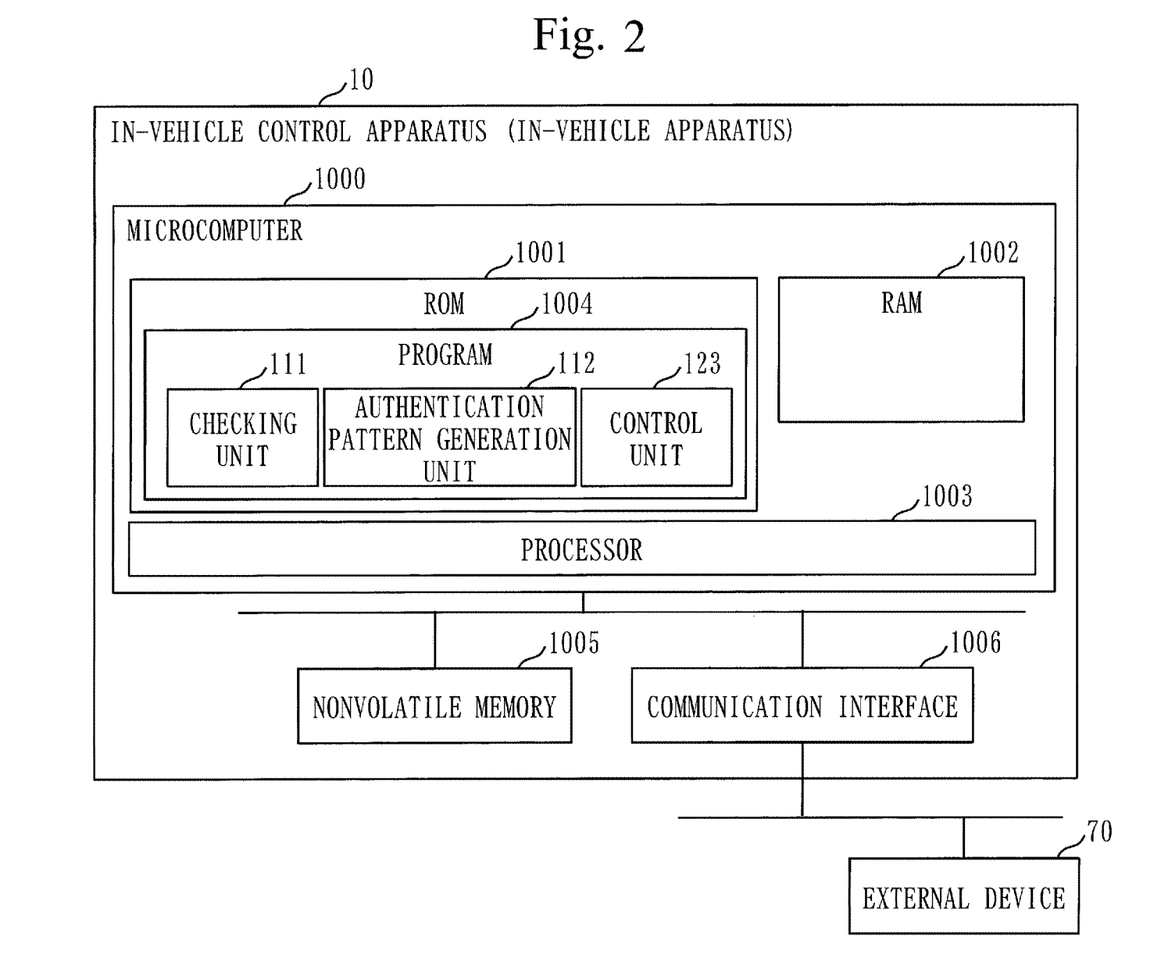
FIG. 2 is a diagram illustrating an example of a hardware configuration of an in-vehicle control apparatus according to Embodiment 1.

FIG. 2 illustrates an example of a hardware configuration of the in-vehicle control apparatus 10.

The in-vehicle control apparatus 10 according to the present embodiment is a computer.

The in-vehicle control apparatus 10 includes, as hardware, a microcomputer 1000, nonvolatile memory 1005, and a communication interface 1006.

The microcomputer 1000 includes ROM 1001, RAM 1002, and a processor 1003.

In the ROM 1001, a program 1004 is stored. The program 1004 is a program to realize at least the checking unit 111, the authentication pattern generation unit 112, and the control unit 123.

The program 1004 is loaded from the ROM 1001 into the RAM 1002. Then, the processor 1003 reads out the program 1004 from the RAM 1002, and executes the program 1004.

By the processor 1003 executing the program 1004, operation of the checking unit 111, the authentication pattern generation unit 112, and the control unit 123 is realized.

The program 1004 may be a program to realize the communication unit 110, the signal receiving unit 121, the signal transmitting unit 122, the engine control unit 13, the door control unit 14, the lighting control unit 15, and the alarm control unit 16 in addition to the checking unit 111, the authentication pattern generation unit 112, and the control unit 123.

The nonvolatile memory 1005 realizes the authentication pattern registration unit 113. In other words, the nonvolatile memory 1005 stores authentication pattern information.

The communication interface 1006 carries out communications with an external device 70. Matters regarding the external device 70 will be described later.

\*\*\*Description of Operation\*\*\*

<Description of Operation: Schema>

Next, referring to FIG. 3 and FIG. 4, an explanation will be given on a schema of operation of the in-vehicle control apparatus 10 according to the present embodiment.

Figure 3:
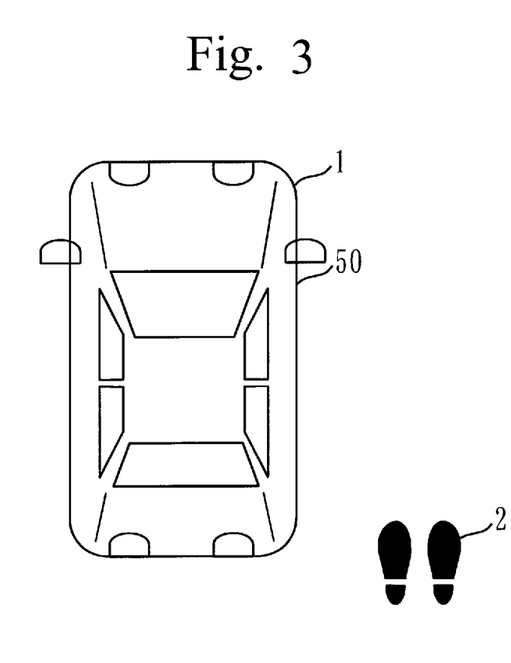
FIG. 3 is a diagram illustrating a vehicle and a user according to Embodiment 1.

FIG. 3 illustrates a vehicle 1 and a user 2.

On a side of the vehicle 1, the lighting device 50 that is able to light up feet of the user 2 is installed.

Figure 4:
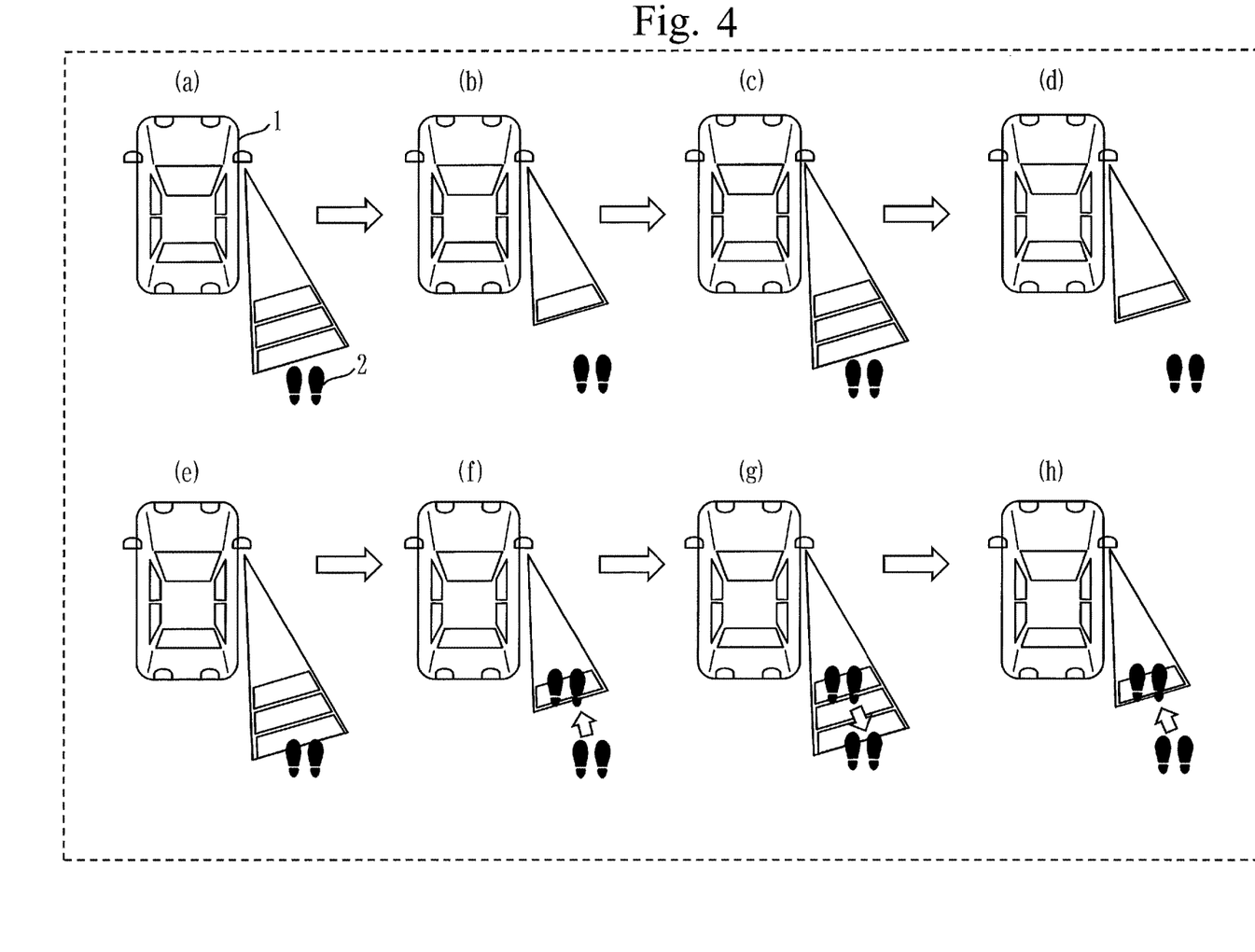
FIG. 4 is a diagram illustrating a schema of operation to the in-vehicle control apparatus according to Embodiment 1.

FIG. 4 illustrates an authentication method applicable when the user 2 carrying the portable device 20 comes close to the vehicle 1.

When the user 2 carrying the portable device 20 comes close to the vehicle 1, radio communication is carried out between the portable device control unit 12 of the in-vehicle control apparatus 10 and the portable device 20, and the control unit 123 of the portable device control unit 12 carries out a first authentication of the portable device 20.

Upon completion of the first authentication, the authentication pattern generation unit 112 selects an authentication pattern, and prompts the user 2 to perform the selected authentication pattern. In the present example, it is assumed that the authentication pattern generation unit 112 has selected, as the authentication pattern, a stepping action to be performed following light of the lighting device 50. The authentication pattern generation unit 112 notifies the lighting control unit 15 of a lighting pattern of the lighting device 50. The lighting control unit 15 controls the lighting device 50 in accordance with the lighting pattern, and causes the lighting device 50 to light up an area around the feet of the user 2.

Here, it is assumed that the lighting pattern is a pattern such that, for example, lighting from the side of the vehicle 1 of a distant area and a close area is repeated as illustrated in (a) to (d) in FIG. 4.

The user 2 steps in accordance with the lighting pattern illustrated in (a) to (d) in FIG. 4. In other words, the user 2 steps back and forward beside the vehicle 1 following an area being lighted up by the light from the lighting device 50 of the vehicle 1, as illustrated in (e) to (h) in FIG. 4.

In the vehicle 1, the control unit 123 senses movement of the user 2. For example, the control unit 123 is able to sense the movement of the user 2 using intensity of a radio communication signal from the portable device 20 that the user 2 carries. More specifically, the control unit 123 is able to calculate distance between the vehicle 1 and the portable device 20 based on the intensity of the radio communication signal, and calculate direction to which the portable device 20 moves, that is, direction to which the user 2 steps. Alternatively, if an optical sensor is installed in the vehicle 1, the control unit 123 may use the optical sensor to calculate distance between the user 2 and the vehicle 1.

In this way, the control unit 123 senses the movement of the user 2, and notifies the checking unit 111 of the sensed movement of the user 2.

Based on the notice from the control unit 123, the checking unit 111 determines whether or not an action of the user 2 matches an action of the authentication pattern.

If the checking unit 111 determines that the action of the user 2 matches the action of the authentication pattern, the checking unit 111 authenticates that the portable device 20 is an authorized device. Then, the checking unit 111 controls the vehicle 1 in accordance with a signal from the portable device 20. As described above, if the checking unit 111 receives a signal of instruction on unlocking of a door is received from the portable device 20 after the authentication of the portable device 20, the checking unit 111 instructs the door control unit 14 to unlock the door.

Thus, according to the present embodiment, the in-vehicle control apparatus 10 prompts the user 2 to perform a specific action as the authentication pattern. And, if the action of the user 2 matches the action of the authentication pattern, the in-vehicle control apparatus 10 permits the user's operation to the vehicle 1. Therefore, even if radio communications between the in-vehicle control apparatus 10 and the portable device 20 is relayed by a malicious third party, it is impossible for such third party to perform a requested action since such third party is not near the vehicle 1. Accordingly, operation to the vehicle 1 by the third party is not permitted. Thus, according to the present embodiment, it is possible to lower a risk of a vehicle being stolen by a relay attack.

In addition, in the example of FIG. 4, it is also possible to enhance welcoming effect to the user 2 by using lighting as a presentation method of an authentication pattern.

Note that the example in which the area beside the vehicle 1 is lighted up is given above as the presentation method of the authentication pattern. However, the authentication pattern generation unit 112 may present the authentication pattern using another type of the lighting device 50 of the vehicle 1, such as a headlight, a reversing light, and an interior light.

The example in which the user 2 steps back and forward as the authentication pattern is also explained above. Alternatively, the authentication pattern may be an action such that the user 2 presses a button on the portable device 20 specific number of times.

For example, the authentication may be carried out by a combination of number of times the lighting device 50 flashes and number of times the button of the portable device 20 is pressed, such that if the lighting device 50 (the headlight, reversing light, or interior light) flashes twice, the user 2 presses the button on the portable device 20 three times.

As an alternative method, the authentication may be carried out by a combination of number of times the lighting device 50 flashes and physical movement of the user 2, such that if the lighting device 50 (the headlight, reversing light, or interior light) flashes twice, the user 2 waves his/her hand twice.

In the example above, the authentication pattern is notified to the user 2 using the lighting device 50. However, the alarming device 60 may be used instead of the lighting device 50. In such case, for example, the authentication may be carried out by a combination of number of times of an alarm and number of times the button on the portable device 20 is pressed, such that if the alarm blares twice, the user 2 presses the button on the portable device 20 three times.

Alternatively, the authentication may be carried out by a combination of operation of the button of the portable device 20 and the physical movement of the user 2 (for example, waving a hand).

Further, as a presenting method of an authentication pattern, a combination of the lighting device 50 and the alarming device 60 may be used.
It is also acceptable that the user 2 is prompted to perform the authentication pattern with a message to notify of the authentication pattern (for example, a message saying, "please step following light") being sent from the signal transmitting unit 122 to the portable device 20.

<Description of Operation: Flowchart>

Figure 5:
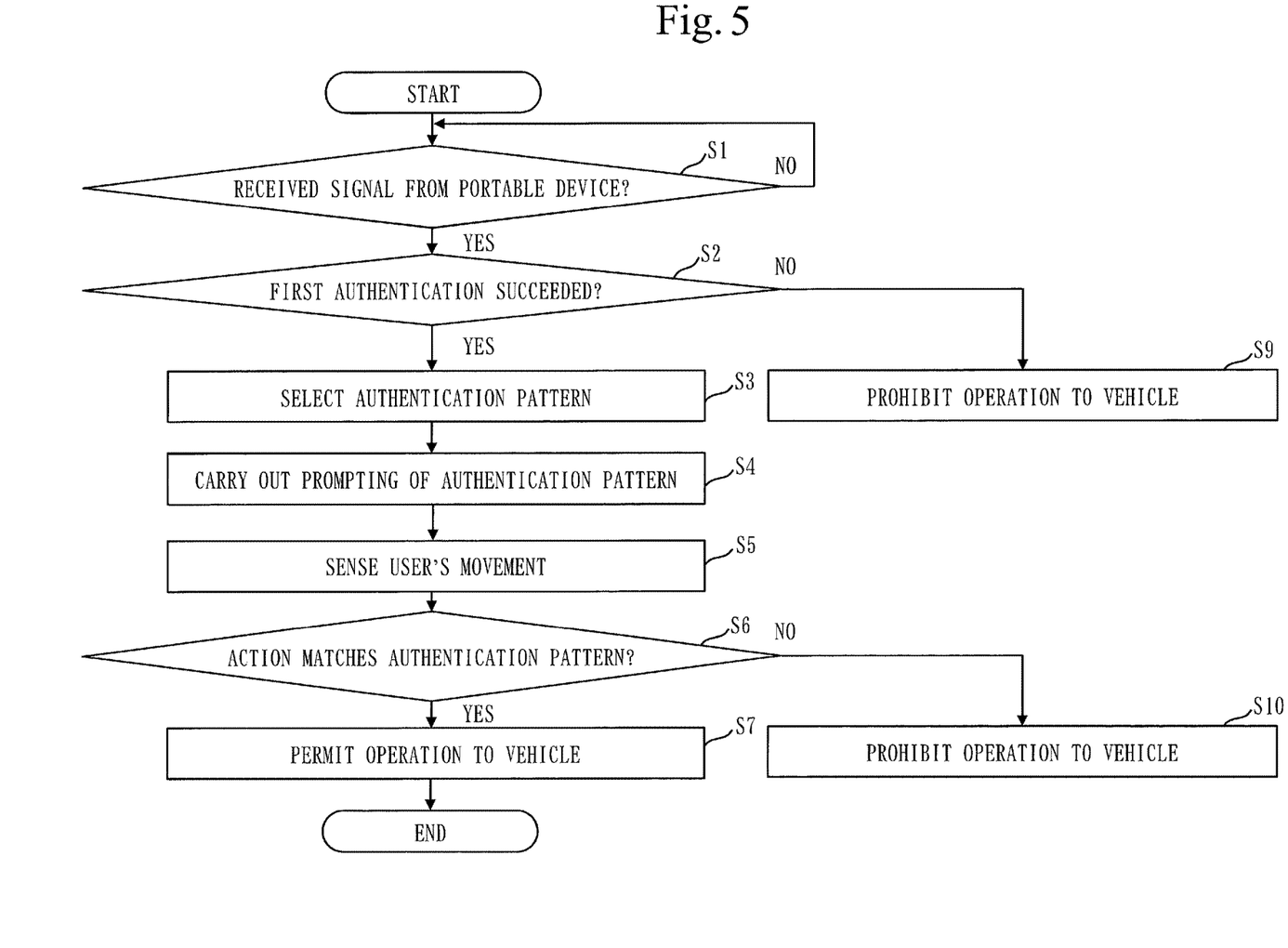
FIG. 5 is a flowchart illustrating an authentication procedure according to Embodiment 1.

FIG. 5 is a flowchart illustrating an example of operation of the in-vehicle control apparatus 10 according to the present embodiment.

Figure 6:
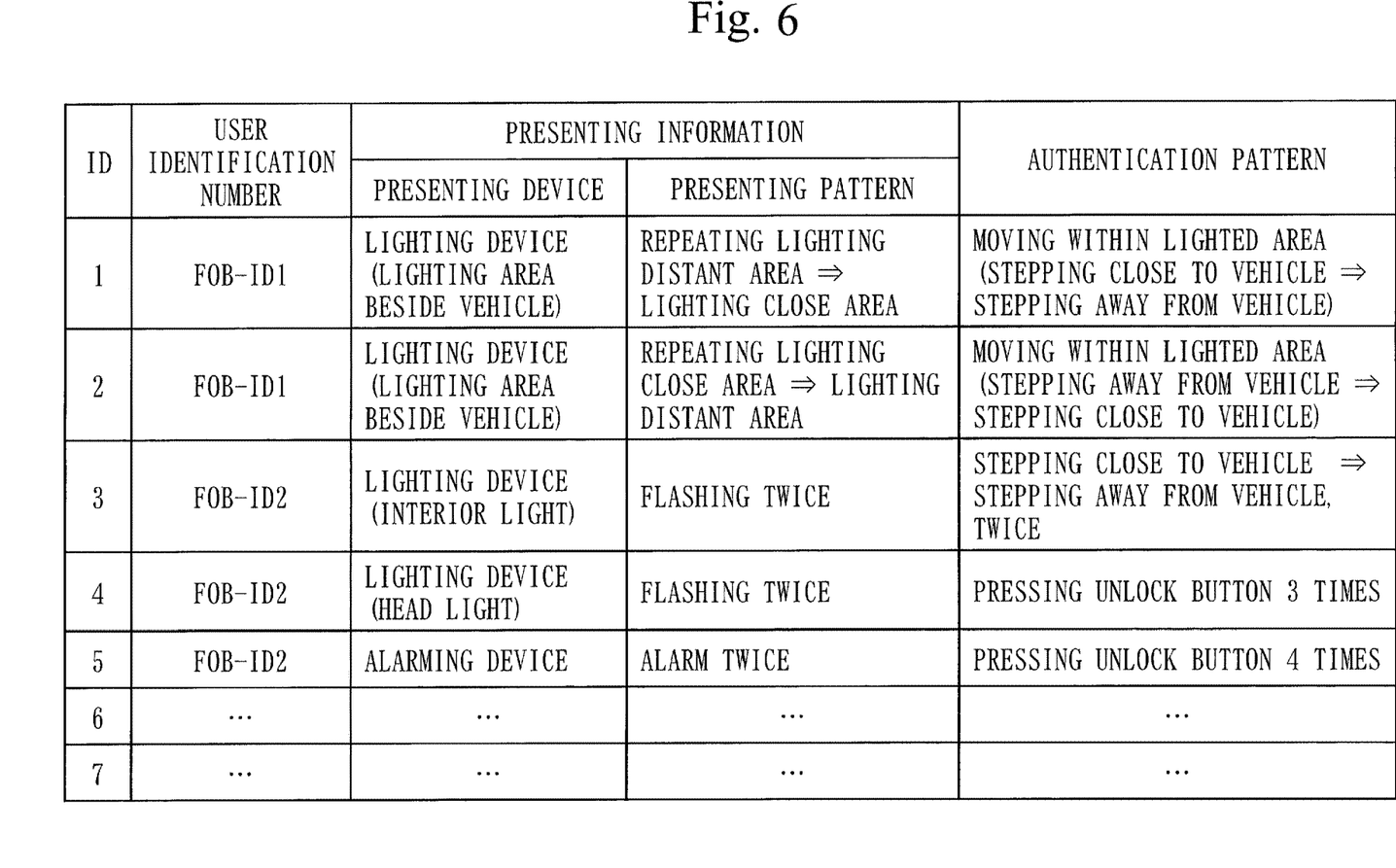
FIG. 6 is a diagram illustrating an example of authentication pattern information according to Embodiment 1.

FIG. 6 illustrates an example of authentication pattern information stored in the authentication pattern registration unit 113.

The in-vehicle control apparatus 10 executes a flow illustrated in FIG. 5.

An explanation will be given below based on the authentication pattern illustrated in FIG. 4.

<Portable Device Control Unit 12>

The signal receiving unit 121 waits for reception of a signal from the portable device 20.

When the signal receiving unit 121 receives the signal from the portable device 20 (YES in step S1), the control unit 123 carries out a first authentication of the portable device 20. For example, as the first authentication, a method may be considered such that the in-vehicle control apparatus 10 preregisters an identifier (ID) of the portable device 20 for the first authentication, the portable device 20 transmits such ID to the in-vehicle control apparatus 10, and then, the in-vehicle control apparatus 10 authenticates the received ID.

If the first authentication succeeds (YES in step S2), the control unit 123 notifies the vehicle integration control unit 11 of success in the first authentication. On the other hand, if the first authentication fails (NO in step S2), the control unit 123 prohibits operation to the vehicle 1 (step S9).

<Vehicle Integration Control Unit 11—Authentication Pattern Generation Unit 112>

When the authentication pattern generation unit 112 receives the notice of success in the first authentication from the control unit 123, the authentication pattern generation unit 112 reads out authentication pattern information registered in the authentication pattern registration unit 113. Then, the authentication pattern generation unit 112 selects a specific authentication pattern from among a plurality of authentication patterns provided in the authentication pattern information read out (step S3), and then, instructs a control unit corresponding to the selected authentication pattern to carry out a prompting of the authentication pattern.

In the example illustrated in FIG. 4, the authentication pattern generation unit 112 notifies the lighting control unit 15 of a lighting pattern of the lighting device 50.

<Lighting Control Unit 15>

The lighting control unit 15 controls the lighting device 50 to carry out the prompting of the authentication pattern (step S4).

In the example of FIG. 4, the lighting control unit 15 drives the lighting device 50 in accordance with the lighting pattern notified from the authentication pattern generation unit 112.

<Portable Device Control Unit 12>

The control unit 123 senses movement of the user 2 (step S5).

In the example illustrated in FIG. 4, the control unit 123 receives a signal from the portable device 20 via the signal receiving unit 121. Then, the control unit 123 calculates distance between the portable device 20 and the in-vehicle control apparatus 10 based on intensity of the radio signal of the portable device 20. Then, the control unit 123 notifies the checking unit 111 of the calculated distance.

<Vehicle Integration Control Unit 11—Checking Unit 111>

The checking unit 111 determines whether or not an action of the user 2 matches the authentication pattern (step S6).

In the example illustrated in FIG. 4, the checking unit 111 determines whether or not a change in the distance between the portable device 20 and the in-vehicle control apparatus 10 matches the lighting pattern notified from the authentication pattern generation unit 112 to the lighting control unit 15. If a plurality of authentication patterns are used, a process from steps S4 to S6 is carried out every time an authentication pattern is switched.

If the action of the user 2 matches the authentication pattern (YES in step S6), the checking unit 111 permits operation to the vehicle 1 by the user 2 (step S7).

On the other hand, if the action of the user 2 does not match the authentication pattern (NO in step S6), the checking unit 111 prohibits the operation to the vehicle 1 (step S10).

A case in which the action of the user 2 does not match the authentication pattern includes both a case in which movement of a user has been successfully sensed, however, the action of the user 2 acquired from the sensed movement does not match the authentication pattern and a case in which there is no movement of the user sensed and thereby recognized that there is no action of the user. In the example of FIG. 4, it is determined as NO in step S6 in both a case in which moving that is different from (e) to (h) of FIG. 4 is sensed, and a case in which the portable device 20 is sensed being still.

Next, referring to FIG. 6, an explanation will be given on the authentication pattern information.

As illustrated in FIG. 6, the authentication pattern information is composed of items of a user identification number, presenting information, and an authentication pattern. And, the presenting information includes items of a presenting device and a presenting pattern.

The user identification number is a number to identify a user of the portable device 20. As the user identification number, a FOB ID can be used. A space of the user identification number may be left blank.

The presenting device is a device that presents the presenting pattern. The presenting device may be any device as long as it is a device that is installed in the vehicle 1 and is able to transmit information to the user 2. In the present embodiment, examples in which the lighting device 50 and the alarming device 60 are used as the presenting devices are given.

The presenting pattern is a pattern for prompting of the authentication pattern. As described above, if the lighting device 50 is used as the presenting device, the presenting pattern is a lighting pattern. And, if the alarming device 60 is used as the presenting device, the presenting pattern is an alarm blaring pattern.

The authentication pattern is an action that a user is caused to perform.

The authentication pattern needs to be an action that only a person near the vehicle 1 can perform. In specific, as described above, the authentication pattern is an action that only a person who is able to see lighting from the lighting device 50 can perform. Also, the authentication pattern is an action that only a person who is able to hear an alarm of the alarming device 60 can perform.

Also, the authentication pattern needs to be an action that can be recognized by the in-vehicle control apparatus 10. As described above, the authentication patterns are the user 2's move that can be recognized by measuring distance between the vehicle 1 and the portable device 20, operation of a button of the portable device 20 that can be recognized by receiving a signal from the portable device 20, and the like.

Next, an explanation will be given on a method to select an authentication pattern.

If a plurality of authentication patterns are written in authentication pattern information as illustrated in FIG. 6, the authentication pattern generation unit 112 selects an authentication pattern at random using, for example, a random number.

If a user identification number is registered, the authentication pattern generation unit 112 is able to select an authentication pattern using a FOB ID received from the portable device 20. In other words, the authentication pattern generation unit 112 is able to select an authentication pattern in a line where a user identification number corresponding to the received FOB ID is written.

Further, if the portable device 20 is connected with a smartphone by means of short-range radio communication, such as Bluetooth (a registered trade mark), it is also acceptable that the smartphone generates a random number, and selects an ID of an authentication pattern using the generated random number. In such case, the smartphone notifies the authentication pattern generation unit 112 of the selected ID of the authentication pattern, and the authentication pattern generation unit 112 selects an authentication pattern corresponding to the notified ID.

Alternatively, the user 2 himself/herself may specify an ID of an authentication pattern.

Alternatively, the external device 70 illustrated in FIG. 2 may be connected with the in-vehicle control apparatus 10 and the authentication pattern information may be rewritten by the external device 70.

*Description of Effect of Embodiment*

In the present embodiment, an in-vehicle control apparatus determines whether or not an action of a user matches an authentication pattern. Therefore, even if an electric wave between a portable device and the in-vehicle control apparatus is relayed by a malicious third party, it is impossible for the malicious third party to perform an action that matches the authentication pattern, and thereby no operation to a vehicle is permitted. Therefore, according to the present embodiment, it is possible to lower a risk of the vehicle being stolen.

Embodiment 2

In the present embodiment, mainly differences from Embodiment 1 will be explained.

Note that matters not explained below are the same as those in Embodiment 1.

*Description of Configuration*

Figure 7:
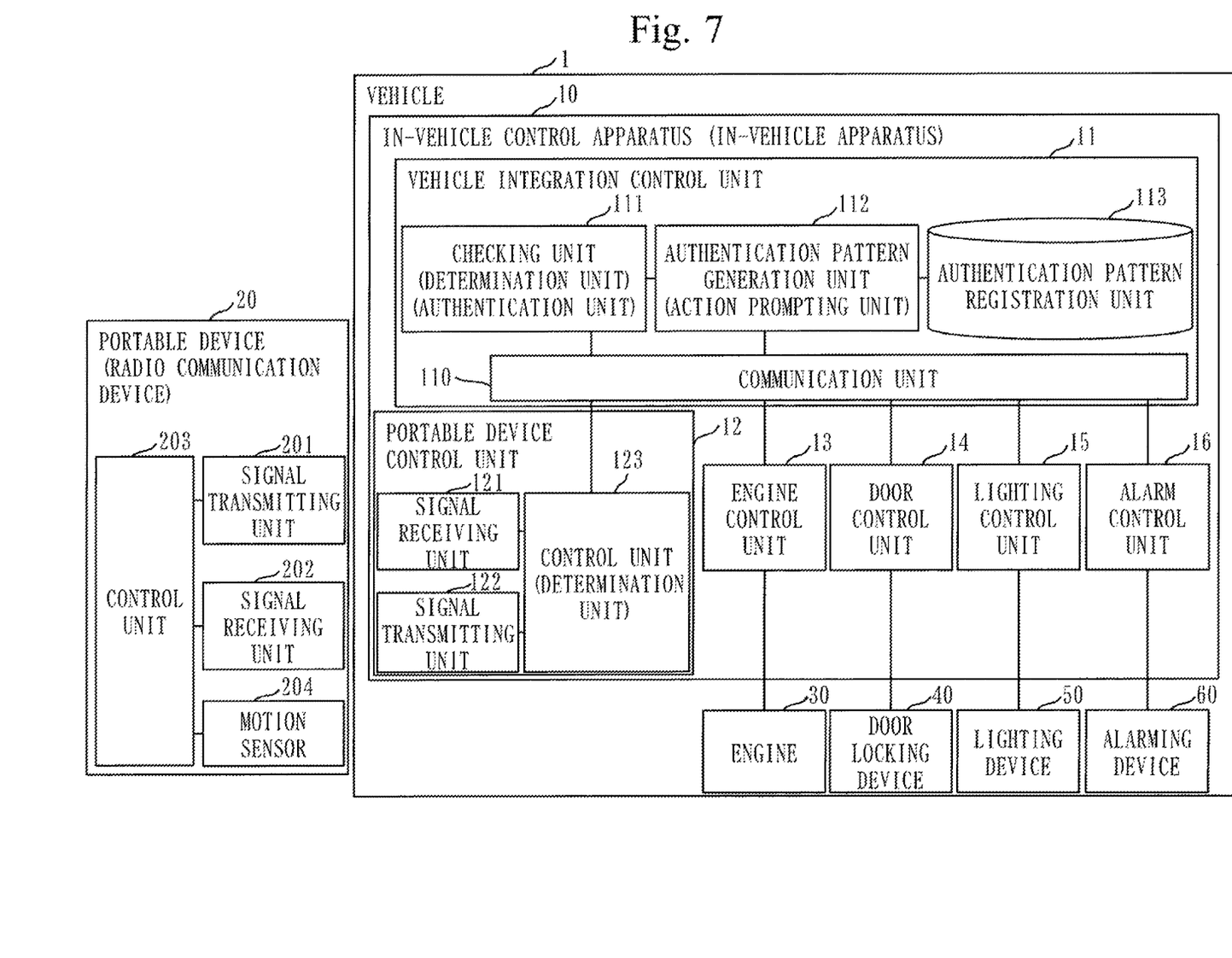
FIG. 7 is a diagram illustrating an example of a configuration of an in-vehicle control system according to Embodiment 2.

FIG. 7 illustrates an example of a configuration of an in-vehicle control system according to the present embodiment.

In FIG. 7, in comparison with the configuration in FIG. 1, a motion sensor 204 is added to the portable device 20.

The motion sensor 204 is composed of, for example, an acceleration sensor and a vibration sensor. The motion sensor 204 can be anything as long as it is able to sense motion of the portable device 20.

Since other components illustrated in FIG. 7 are the same as those illustrated in FIG. 1, an explanation thereon is omitted.

*Description of Operation*

Figure 8:
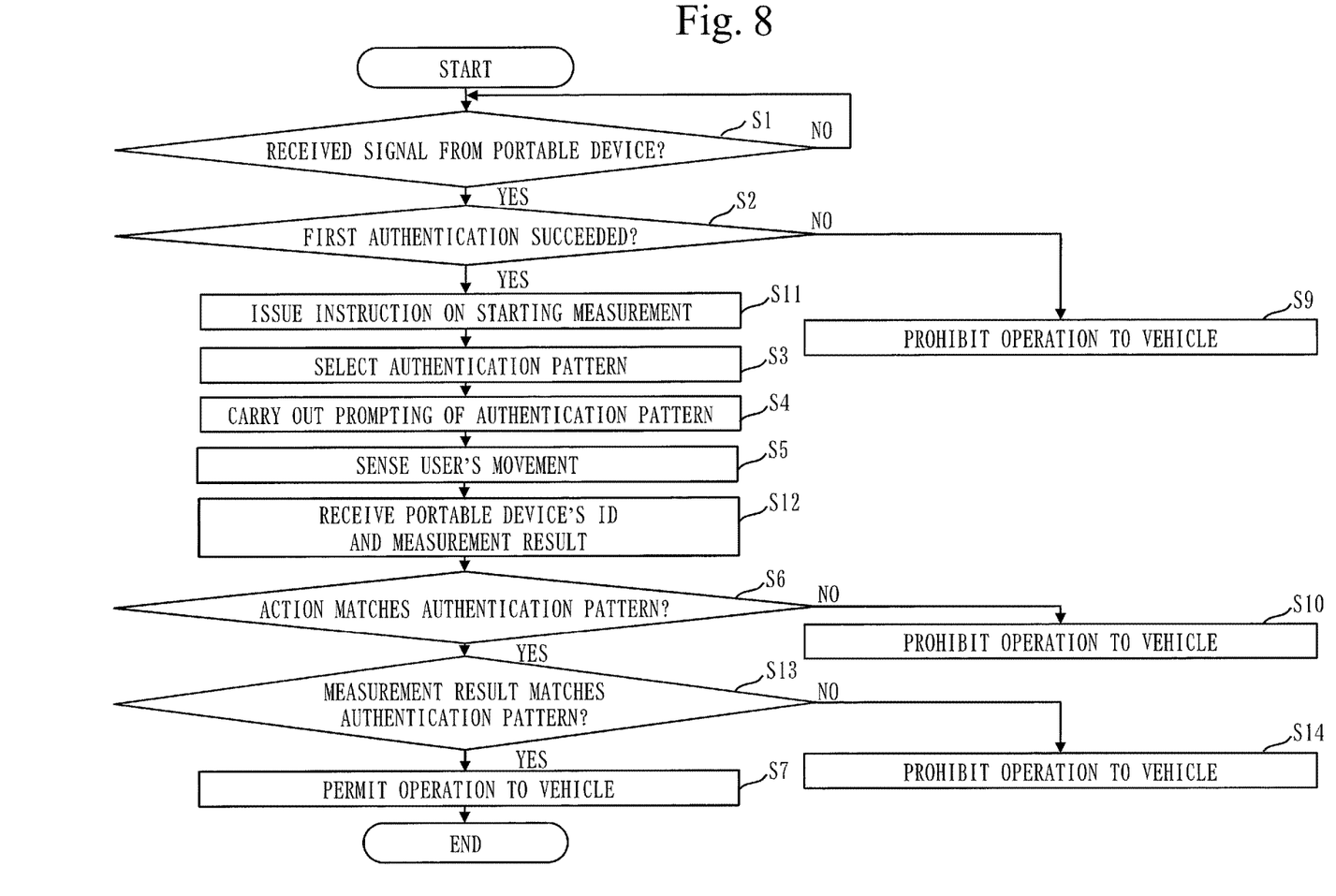
FIG. 8 is a flowchart illustrating an authentication procedure according to Embodiment 2.

FIG. 8 is a flowchart illustrating an example of operation of an in-vehicle control apparatus 10 according to the present embodiment.

Steps S1 and S2 in FIG. 8 are the same as those illustrated in FIG. 5.

If a first authentication succeeds in step S2 (YES in step S2), the control unit 123 instructs the portable device 20 to start measuring of the motion sensor 204 (step S11).

Steps S3 to S4 and S9 are the same as those illustrated in FIG. 5.

In step S5, concurrently with sensing of movement of the user 2 by the in-vehicle control apparatus 10, the motion sensor 204 in the portable device 20 measures acceleration and vibration that are caused by the movement of the user 2.

In the portable device 20, the signal transmitting unit 201 transmits an ID of the portable device 20 and a result of measurement of the motion sensor 204, and the signal receiving unit 121 receives the ID of the portable device 20 and the result of measurement (step S12).

Steps S6 and S10 are the same as those illustrated in FIG. 5.

If an action of the user 2 matches an authentication pattern (YES in step S6), the checking unit 111 determines whether or not the result of measurement of the motion sensor 204 and the authentication pattern matches (step S13).

If the result of measurement and the authentication pattern matches (YES in step S13), the checking unit 111 permits operation to the vehicle 1 by the user 2 (step S7).

On the other hand, if the result of measurement and the authentication pattern does not match (NO in step S13), the checking unit 111 prohibits operation to the vehicle 1 (step S14).

*Description of Effect of Embodiment*

The present embodiment allows determination with a higher accuracy on whether or not an authentication pattern and an action of a user matches, using a result of measurement by a motion sensor. Thus, according to the present embodiment, it is possible to more effectively lower a risk of a vehicle being stolen by a relay attack.

The embodiments of the present invention are explained above. However, these two embodiments may be implemented in combination.

Alternatively, one of these two embodiments may be implemented partly.

Alternatively, these two embodiments may be implemented partly in combination.

Note that the present invention is not limited to these embodiments, and may be changed in various ways as necessary.

*Description of Hardware Configuration*

Finally, a supplementary explanation of a hardware configuration of the in-vehicle control apparatus 10 will be given.

The processor 1003 illustrated in FIG. 2 is an integrated circuit (IC) that carries out processing.

The processor 1003 is a central processing unit (CPU), a digital signal processor (DSP), or the like.

And also, the program 1004 in the ROM 1001 includes an operating system (OS).

And, at least a part of the OS is executed by the processor 1003.

The processor 1003 executes at least a part of the OS.

By the processor 1003 executing the OS, task management, memory management, file management, communication control, and the like are carried out.

Also, at least any of information, data, a signal value, and a variable value that indicates a result of a process of at least any of the checking unit 111, the authentication pattern generation unit 112, and the control unit 123 is stored in at least any of the RAM 1002, and a register and cache memory in the processor 1003.

Also, programs that realize functions of the checking unit 111, the authentication pattern generation unit 112, and the control unit 123 may be stored in a portable storage medium, such as a magnetic disk, a flexible disk, an optical disc, a compact disc, a Blu-ray (a registered trademark) disc, and a DVD.

Also, "unit" of the checking unit 111, the authentication pattern generation unit 112, and the control unit 123 may be replaced by a "circuit", a "step", a "procedure", or a "process".

Also, the in-vehicle control apparatus 10 may be realized by a processing circuit. The processing circuit is, for example, a logic integrated circuit (IC), a gate array (GA), an application-specific integrated circuit (ASIC), or a field-programmable gate array (FPGA).

In this case, each of the checking unit 111, the authentication pattern generation unit 112, and the control unit 123 is realized as a part of the processing circuit.

Note that, in this description, a broader concept of a processor, memory, a combination of the processor and the memory, and the processing circuit is called as "processing circuitry".

In other words, each of the processor, the memory, the combination of the processor and the memory, and the processing circuit is an example of the "processing circuitry".

REFERENCE SIGNS LIST

1: vehicle; 2: user; 10: in-vehicle control apparatus; 11: vehicle integration control unit; 12: portable device control unit; 13: engine control unit; 14: door control unit; 15: lighting control unit; 16: alarm control unit; 20: portable device; 30: engine; 40: door locking device; 50: lighting device; 60: alarming device; 70: external device; 110: communication unit; 111: checking unit; 112: authentication pattern generation unit; 113: authentication pattern registration unit; 121: signal receiving unit; 122: signal transmitting unit; 123: control unit; 201: signal transmitting unit; 202: signal receiving unit; 203: control unit; 204: motion sensor; 1000: microcomputer; 1001: ROM; 1002: RAM; 1003: processor; 1004: program; 1005: nonvolatile memory; 1006: communication interface.

The invention claimed is:

1. An in-vehicle apparatus mounted on a vehicle, the in-vehicle apparatus comprising:
   processing circuitry to:
      if a signal from a radio communication device is received, cause a lighting device to light up an area around feet of a person who is close to the vehicle, the lighting device being installed in the vehicle so as to light up the area, and prompt a user who uses the radio communication device to perform a specific action;
      determine whether or not the user has performed the specific action; and
      if it is determined that the user has performed the specific action, authenticate that the radio communication device is an authorized device,
   wherein the processing circuitry selects as the specific action, an action associated with an identifier (ID) of the user from among a plurality of actions associated with IDs of a plurality of users, and prompts the user to perform the selected action as the specific action.

2. The in-vehicle apparatus according to claim 1, wherein the processing circuitry causes the lighting device installed on a side of the vehicle to light up the area, and prompts the user to perform an action of stepping along the side of vehicle, as the specific action.

3. The in-vehicle apparatus according to claim 1, wherein the processing circuitry prompts the user to perform the specific action via an alarming device installed in the vehicle on which the in-vehicle apparatus is mounted.

4. The in-vehicle apparatus according to claim 1, wherein the processing circuitry prompts the user to perform the specific action by communicating with the radio communication device.

5. The in-vehicle apparatus according to claim 1, wherein the processing circuitry senses movement of the user, and determines whether or not the user has performed the specific action.

6. The in-vehicle apparatus according to claim 1, wherein the processing circuitry receives from the radio communication device, a result of measurement of a motion sensor installed in the radio communication device, and determines whether or not the user has performed the specific action using the received result of measurement.

7. The in-vehicle apparatus according to claim 1, wherein the processing circuitry changes at least one action of the plurality of actions based on an instruction from the outside.

8. An authentication method comprising:
   if a signal from a radio communication device is received, causing a lighting device to light up an area around feet of a person who is close to a vehicle, the lighting device being installed in the vehicle so as to light up the area, and prompting a user who uses the radio communication device to perform a specific action;
   determining whether or not the user has performed the specific action; and
   if it is determined that the user has performed the specific action, authenticating that the radio communication device is an authorized device, wherein the processing circuitry selects as the specific action, an action associated with an identifier (ID) of the user from among a plurality of actions associated with IDs of a plurality of users, and prompts the user to perform the selected action as the specific action.

9. A non-transitory computer readable medium storing an authentication program that causes a computer to execute:
an action prompting process of causing a lighting device to light up an area around feet of a person who is close to a vehicle, the lighting device being installed in the vehicle so as to light up the area, and prompting a user who uses a radio communication device to perform a specific action if a signal from the radio communication device is received;
a determination process of determining whether or not the user has performed the specific action; and
an authentication process of authenticating that the radio communication device is an authorized device if it is determined by the determination process that the user has performed the specific action,
wherein the processing circuitry selects as the specific action, an action associated with an identifier (ID) of the user from among a plurality of actions associated with IDs of a plurality of users, and prompts the user to perform the selected action as the specific action.

* * * * *